(12) United States Patent
Tokappa et al.

(10) Patent No.: US 10,430,319 B1
(45) Date of Patent: Oct. 1, 2019

(54) SYSTEMS AND METHODS FOR AUTOMATIC SOFTWARE TESTING

(71) Applicant: FMR LLC, Boston, MA (US)

(72) Inventors: Ananda Kumar Tokappa, Karnataka (IN); Meenakshi Ashokkumar, Bangalore (IN); Samir Kakkar, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/971,659

(22) Filed: May 4, 2018

(51) Int. Cl.
*G06F 11/36* (2006.01)

(52) U.S. Cl.
CPC ........ *G06F 11/368* (2013.01); *G06F 11/3684* (2013.01); *G06F 11/3688* (2013.01); *G06F 11/3692* (2013.01)

(58) Field of Classification Search
CPC .............. G06F 11/368; G06F 11/3684; G06F 11/3688; G06F 11/3692
USPC ................................................ 717/124–135
See application file for complete search history.

(56) References Cited

U.S. PATENT DOCUMENTS

| | | | |
|---|---|---|---|
| 8,276,123 B1* | 9/2012 | Deng | G06F 11/3688 714/37 |
| 8,694,966 B2 | 4/2014 | Gupta | |
| 9,032,373 B1 | 5/2015 | Gupta et al. | |
| 9,477,580 B2 | 10/2016 | Chan et al. | |
| 2014/0282411 A1 | 9/2014 | Liemandt et al. | |
| 2015/0007148 A1 | 1/2015 | Bartley et al. | |
| 2015/0026664 A1 | 1/2015 | Bartley et al. | |
| 2015/0169431 A1* | 6/2015 | Ivankovic | G06F 11/3676 717/124 |
| 2017/0132119 A1* | 5/2017 | Xu | G06F 11/3676 |
| 2018/0121322 A1* | 5/2018 | Reyes | G06F 11/3616 |
| 2018/0314519 A1* | 11/2018 | Lee | G06F 8/71 |

\* cited by examiner

*Primary Examiner* — Qing Chen
(74) *Attorney, Agent, or Firm* — Proskauer Rose LLP

(57) ABSTRACT

A method of testing source code for a computer application includes: monitoring a source code repository to detect when a changed version of one or more source code files is saved to the repository; identifying, for a source code file that has changed, one or more changed features of the file, by comparing a changed version of the file with a previous version of the file; generating, based on the one or more changed features, a source code artifact for use in testing the file; generating, based on the source code artifact, a test case framework artifact for use in testing the file; executing one or more test cases based on the one or more changed features, the source code artifact, and the test case framework artifact; and compiling a report including details of the executed test cases.

21 Claims, 6 Drawing Sheets

200

205 Monitoring, by a server having a processor and a memory, a source code repository having a plurality of source code files stored in the memory, to detect when a changed version of one or more source code files is saved to the source code repository

210 Identifying, by the processor, for a source code file that has changed, one or more changed features of the source code file, by comparing a changed version of the source code file with a previous version of the source code file

215 Generating, by the processor, based on the one or more changed features, a source code artifact for use in testing the source code file

220 Generating, by the processor, based on the source code artifact, a test case framework artifact for use in testing the source code file

225 Executing, by the processor, one or more test cases based on the one or more changed features, the source code artifact, and the test case framework artifact

230 Compiling, by the processor, a report including details of the executed test cases

SYSTEMS AND METHODS FOR AUTOMATIC SOFTWARE TESTING

TECHNICAL FIELD

This application relates generally to systems, methods and apparatuses, including computer programs, for testing computer software. More specifically, this application relates to automated execution of computer software test cases in an enterprise computing environment.

BACKGROUND

In enterprise computing environments, software development often occurs using a collaborative model such as a GIT repository. Under this model, individual developers log into a main branch (e.g., a centralized server) remotely, "check out" a specific computer code file for development, write or edit code, and, after development is complete, check the changed file back into the main branch. After the changed file is checked in, one or more test cases are executed to determine if the changed code has any errors requiring the further attention of the developer.

Currently, when a developer merges code back into the main branch, all test cases in the suite test are run manually and/or automatically, irrespective of the features that are impacted by the code change. However, it is not necessary to run the entire suite, as the code change may impact only one or a few features. What is needed is an efficient manner of running and reporting the results of only selected test cases that are related to the features affected by code changed during the development session, thereby saving enterprise time and resources.

SUMMARY

The present invention includes systems and methods for identifying computer code features that have been added or changed during a software development session, so that only related test cases are required to be executed. The invention can begin the process of identifying related test cases automatically as soon as a developer commits changed code to the main branch. The invention can proceed to run the test cases automatically; apportion the work to be completed in a distributed computing architecture; assemble the results of all of the test cases; generate a single cohesive report for the developer; and provide the report to the developer automatically (e.g., via a web link and/or an email). In some embodiments, committing the computer code file to the main branch (e.g., source code repository) sets a series of four automated processes (e.g., Jenkins jobs) in motion that ultimately produce a report (e.g., a Cucumber report) detailing the results of the executed test cases for the developer's review.

Following the above approach, execution time can be reduced (e.g., dramatically). Moreover, because of the reduced execution time, tests can be executed every time code is checked in, thus providing an opportunity for the developers to receive immediate feedback on any particular code change. Overall, the model helps adopt a fail-fast methodology so the developer receives immediate feedback on her or his code and can take appropriate action. In some embodiments, a testing hub has embedded intelligence, which ensures that the test cases are grouped, allocated, and executed most efficiently, based on resource requirements (e.g., ports, files, or databases) and/or parameters collected from historical data. This approach can help ensure that the total time taken for execution of the entire process is minimized.

In one aspect, the invention features a method of testing source code for a computer application. The method includes monitoring, by a server having a processor and a memory, a source code repository having a plurality of source code files stored in the memory, to detect when a changed version of one or more source code files is saved to the source code repository. The method also includes identifying, by the server, for a source code file that has changed, one or more changed features of the source code file, by comparing a changed version of the source code file with a previous version of the source code file. The method also includes generating, by the server, based on the one or more changed features, a source code artifact for use in testing the source code file. The method also includes generating, by the server, based on the source code artifact, a test case framework artifact for use in testing the source code file. The method also includes executing, by the server, one or more test cases based on the one or more changed features, the source code artifact, and the test case framework artifact. The method also includes compiling, by the server, a report including details of the executed test cases.

In some embodiments, a web hook is used to monitor the source code repository, e.g., by "listening" for developers connecting to the GIT repository, coding, and checking code files in and out. In some embodiments, a custom script is integrated into background software of the centralized server running the GIT repository and can be used to determine which part of the code has been modified. In some embodiments, a mapping file is used to identify a source code file that has been changed. In some embodiments, identifying one or more changed features of the source code file further comprises generating a list of impacted features. In some embodiments, the steps of identifying one or more changed features of the source code file, generating a source code artifact for use in testing the source code file, generating a test case framework artifact for use in testing the source code file, and executing one or more test cases are triggered automatically when the changed version of the source code file is saved to the repository.

In some embodiments, the steps of identifying one or more changed features of the source code file, generating a source code artifact for use in testing the source code file, generating a test case framework artifact for use in testing the source code file, and executing one or more test cases are performed automatically as Jenkins jobs for each source code file that has changed. In some embodiments, generating a source code artifact for use in testing the source code file includes building an artifact of iOS source code. In some embodiments, generating a test case framework artifact for use in testing the source code file includes using a code building tool to build the test case framework with a command "mvn clean package," which cleans an old build and generates a new artifact. In some embodiments, executing one or more test cases based on the one or more changed features, the source code artifact, and the test case framework artifact is accomplished using a parallel execution grid having a hub and one or more nodes, the hub configured to receive and distribute the one or more test cases to the one or more nodes, the one or more nodes configured to execute the one or more test cases in parallel and report to the hub a status of each test case after execution (e.g., via an Appium grid). In some embodiments, the hub is configured to perform intelligent tasks including configuring a virtual machine based on the number of test cases to be executed and grouping similar test cases based on resource requirements.

In some embodiments, the source code repository includes a distributed version control system (e.g., included in a GIT repository). In some embodiments, the one or more test cases are executed in parallel using a central distribution hub in electronic communication with the server, the central distribution hub also in electronic communication with one or more locations on a test case execution grid. In some embodiments, the generated report is a Cucumber report. In some embodiments, the details of the executed test cases include, for each test case executed, a complete stack trace, a status of each step, an indication of any failed test cases, and for any failed test cases, an indication of why the test was failed. In some embodiments, the server memory stores a standard set of critical test cases corresponding to each feature in a correspondence table. In some embodiments, the method provides for at least one of grouping or allocation of test cases based on historical test case execution data. In some embodiments, the report is a real-time report for viewing by a software developer, the report including at least a name of a test that failed, details of what step failed execution, and a reason for the failed execution.

In some embodiments, using a mapping file helps developers to organize code in a more structured and/or meaningful way. In some embodiments, code can be tested against multiple device types and/or simulators. In some embodiments, the invention generates and triggers an email to be sent to the developer, with test results embedded within the email, to provide immediate feedback to the developer. In some embodiments, the test results not only indicate which tests were executed successfully or not, but also include details of which tests failed and at which step, saving time on subsequent failure analysis and re-strategizing.

In another aspect, the invention features a system for testing source code for a computer application. The system includes a server having a processor and first server memory. The first server memory has a source code repository including one or more source code files. The server is configured to monitor the source code repository to detect when a changed version of one or more source code files is saved to the source code repository. The server is also configured to identify, for a source code file that has been changed, one or more changed features of the source code file, by comparing a changed version of the source code file with a previous version of the source code file. The server is also configured to generate, based on the one or more changed features, a source code artifact for use in testing the source code file. The server is also configured to generate, based on the source code artifact, a test case framework artifact for use in testing the source code file. The server is also configured to execute one or more test cases based on the one or more changed features, the source code artifact, and the test case framework artifact. The server is also configured to generate a report including details of the executed test cases.

In some embodiments, the server includes a web hook to monitor the source code repository. In some embodiments, the server includes a parallel execution grid having a hub and one or more nodes, the hub configured to receive and distribute the one or more test cases to the one or more nodes, the one or more nodes configured to execute the one or more test cases in parallel and report to the hub a status of each test case after execution (e.g., via an Appium grid). In some embodiments, the source code repository includes a distributed version control system (e.g., included in a GIT repository). In some embodiments, the first server memory stores a standard set of critical test cases corresponding to each feature. In some embodiments, whereas previously all of the test cases had to be run instead of only the ones that changed, resulting in test time of several hours, the present process can take 30 minutes or less, in some cases 10 minutes or less.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

FIG. 2 is a flow diagram of a method for automatically testing computer code, according to an illustrative embodiment of the invention.

DETAILED DESCRIPTION

Figure 1:
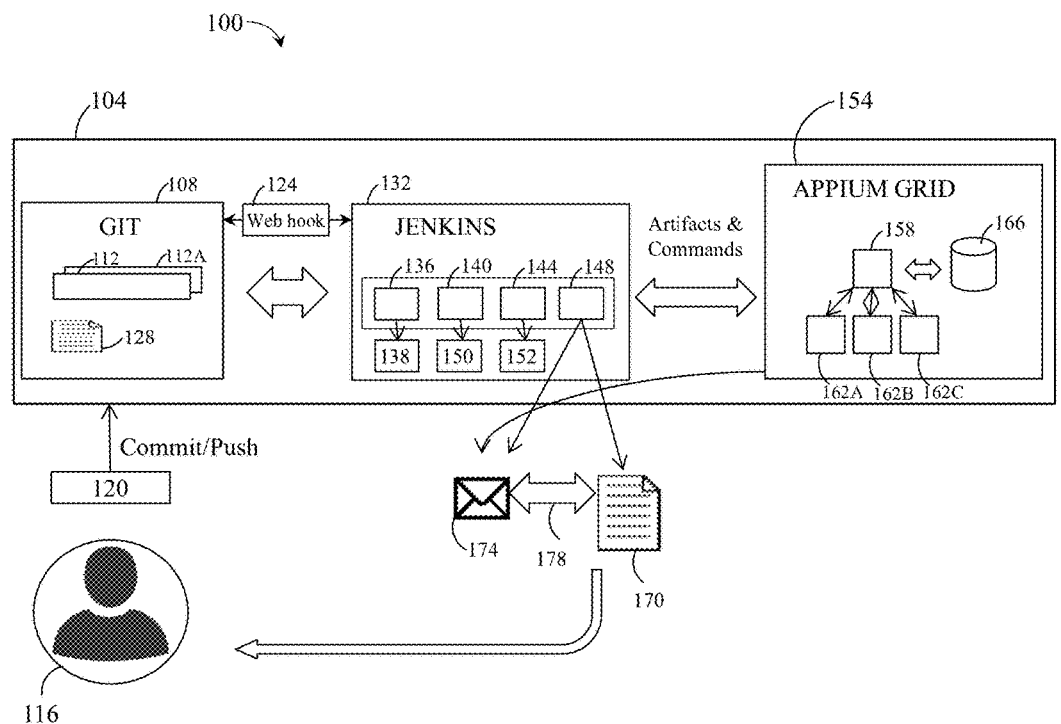
FIG. 1 is a block diagram of a system for automatically testing computer code, according to an illustrative embodiment of the invention.

FIG. 1 is a block diagram of a system 100 for automatically testing computer code, according to an illustrative embodiment of the invention. The system 100 includes one or more servers 104 having a processor and a memory (described as "the server 104" for convenience, although the elements contained within the server 104 may exist separately in independent servers that are in electronic communication with one another, e.g., in a clustered environment). The server 104 hosts a source code repository 108 (e.g., a GIT repository) having one or more source code files (e.g., source code file 112). A web developer 116 can log into the server 104 remotely via a development portal 120 in electronic communication with the server 104. The web developer 116 can use the development portal 120 to develop (e.g., edit) the source code file 112, thereby producing a changed version of the source code file 112A. After development is complete, the web developer 116 can check the changed version of the source code file 112A back into the source code repository 108, leaving both the original source code file 112 and the changed version of the source code file 112A on the server 104. This process can repeat for multiple iterations as development occurs over time.

The Jenkins framework 132, which is hosted on the server 104, can be monitoring development activity in the background for changed source code files that are committed to the repository 108 (e.g., periodically or continuously). A web hook 124 in communication with the repository 108 can be used for this purpose. Upon developer 116 committing the changed source code file 112A to the source code repository 108, a series of four automated processes 132 (e.g., Jenkins jobs 136, 140, 144, 148) can be triggered automatically, ultimately producing a report detailing the results of the executed test cases for the developer's review.

The web hook 124 compares the source code file 112 with the changed version of the source code file 112A and triggers a first Jenkins Job 136 when there is a change. The first Jenkins Job 136 identifies the changed file 112A and looks it up against a mapping file 128, stored in the repository 108, to identify which features were impacted due to the code change. The first Jenkins Job 136 then generates a first list 138 of impacted features. For this purpose, the command "git diff --name-only $GIT_PREVIOUS_comma $GIT_COMMIT $DIR_PATH" can provide a list of changed directories, and a script can compare the changed directory names with the names in the mapping file 128 to identify the features impacted by the code change. A sample script to implement the first Jenkins Job 136 is provided in Appendix A. The first Jenkins Job 136 passes the list 138 to the second Jenkins Job 140 and triggers the second Jenkins Job 140 to begin.

The second Jenkins Job 140 generates a source code artifact 150 (e.g., a .app file). A sample script for implementing the second Jenkins Job 140 is included as Appendix B. Once the source code artifact 150 is generated, the second Jenkins Job 140 passes the first list 138 to the third Jenkins Job 144 and triggers the third Jenkins Job 144, which in turn generates a test case framework artifact 152 (e.g., a .jar file). In some embodiments, the third Jenkins Job 144 uses a code building tool called Maven to build the test case framework using a command "mvn clean package" to generate the test case framework artifact 152. This command directs the Maven tool to clean the existing build and create a new one. In some embodiments, the third Jenkins Job 144 has only a "mvn clean package" command, which directs the Maven tool to clean the existing build and create a new one.

Once the test case framework artifact 152 is generated, the third Jenkins Job 144 passes the first list 138 to the fourth Jenkins Job 148 and triggers the fourth Jenkins Job 148. The fourth Jenkins Job 148 pulls the source code artifact 150 that was generated by the second Jenkins Job 140; deploys it on the nodes 162 (e.g., simulators) in the Appium grid 154; pulls the test case framework artifact 152 that was generated by the third Jenkins Job 144; passes it to the Appium grid 154 for execution of the test cases; fetches the feature test case IDs from the database 166 based on the feature names provided as input from the third Jenkins job 144; and/or executes those test case IDs against the Appium grid 154. The fourth Jenkins Job 148 then uses the server 104 to compile a report 170 (e.g., a Cucumber report) including details of the executed test cases. The fourth Jenkins Job 148 can also trigger an email 174 including a link 178 to the report 170 to be sent to the developer 116 automatically. A sample script for implementing the fourth Jenkins Job 148 is included as Appendix C. After execution of test cases related to a specific impacted feature is complete, the Appium grid 154 can provide a notification back to the fourth Jenkins Job 148 that execution has been completed.

In some embodiments, the entire above-described process can completed within 30 minutes without manual intervention, and the developer 116 can be provided with the report 170 in real-time or near-real-time, thus promoting and supporting continuous integration and continuous delivery (CI/CD) objectives. In some embodiments, the system 100 includes more than one web development portal having the same basic structure as portal 116. In some embodiments, the basic process described above remains similar in scenarios in which multiple developers are committing code simultaneously.

The Appium grid 154, which can be an open source framework, includes a hub 158 and one or more nodes 162 (e.g., nodes 162A, 162B, 162C, etc.) in communication with the hub 158. The hub 158 is responsible for distributing test cases to the attached nodes 162 and to obtain a status of each test case's steps. The test cases are written into an Appium test case framework and are saved in a separate GIT repository (not shown). The test cases can be added, updated or removed at any time from the back end, and the changes can be reflected whenever the Jenkins Jobs 136, 140, 144, 148 execute. Each test case ID is stored in the database 166, one time after creating the test case in the Appium grid 154. The nodes 162 can then execute the test cases in parallel and report back on the status of each test case execution to the hub 158.

In some embodiments, the hub 158 performs intelligent tasks, such as creating or configuring the Appium grid 154 based on the number of test cases. For a larger number of test cases, the Appium grid 154 can configure a larger number of virtual machines to perform the work. The hub 158 can also group similar test cases based on resource requirements (e.g., ports, files, or databases) and can assign similar test cases to similar virtual machines. The hub 158 can also use parameters from historical data of test case execution to group and allocate test cases so as to more effectively utilize virtual machines. For example, the hub 158 can consider the time taken from previous runs, the platform (e.g., iOS or Android and version information), to group test cases and allocate them to a virtual machine. In some embodiments, the hub 158 includes other intelligent programming that ensures that the test cases are grouped, allocated, and executed most efficiently.

FIG. 2 is a flow diagram 200 of a method for automatically testing computer code, according to an illustrative embodiment of the invention. In a first step 205, a server having a processor and a memory monitors a source code repository having a plurality of source code files stored in the memory to detect when a changed version of one or more source code files is saved to the source code repository. In a second step 210, the server identifies, for a source code file that has changed, one or more changed features of the source code file, by comparing a changed version of the source code file with a previous version of the source code file. In a third step 215, the server generates, based on the one or more changed features, a source code artifact for use in testing the source code file. In a fourth step 220, the server generates, based on the source code artifact, a test case framework artifact for use in testing the source code file. In a fifth step 225, the server executes one or more test cases based on the one or more changed features, the source code artifact, and the test case framework artifact. In a sixth step 230, the server compiles a report including details of the executed test cases. In some embodiments, one or more of these steps are performed in accordance with the additional details set forth below.

Figure 3:
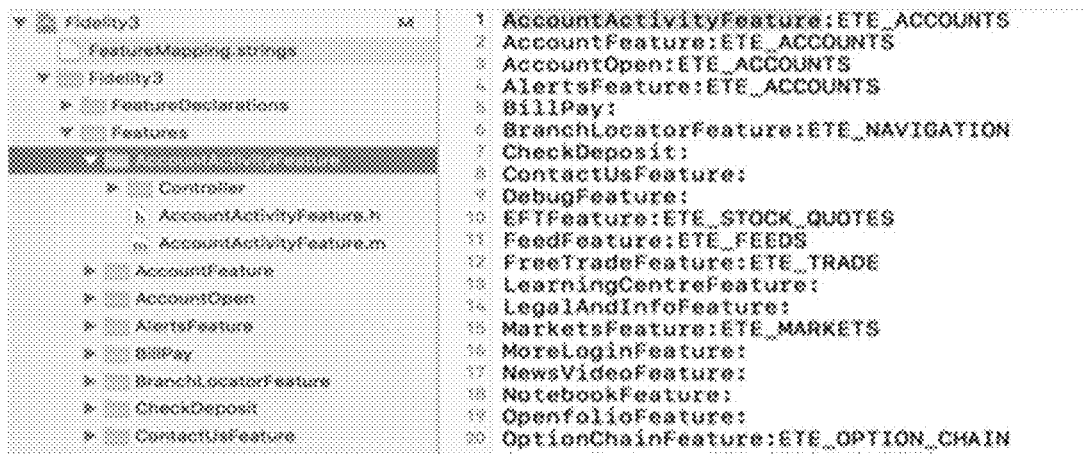
FIG. 3 is an illustration of a mapping file structure, according to an illustrative embodiment of the invention.

FIG. 3 is an illustration of a mapping file structure 300, according to an illustrative embodiment of the invention. The mapping file structure 300 can include a directory or file name as a "key" and a feature name as a value separated by a colon (":"). For example, the text "AccountActivityFeature" corresponds to the first directory name, and the text "ETE_ACCOUNTS" corresponds to the first feature name. The first Jenkins Job (e.g., first Jenkins Job 136 shown and described above in connection with FIG. 1) can use a mapping file having the mapping file structure 300 shown in FIG. 3 to discern which directory was changed and to list out the impacted features that need to be tested.

Figure 4A:
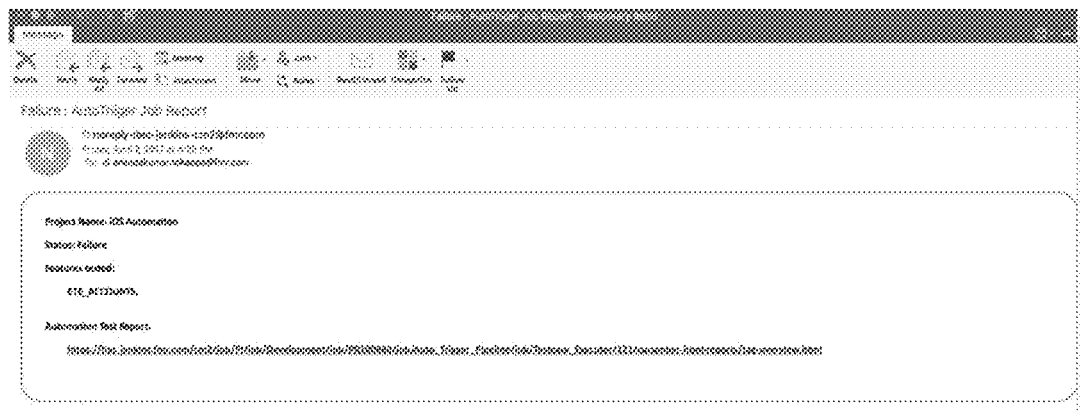
FIG. 4A shows a screenshot of an email notification indicating a successful test case execution, according to an illustrative embodiment of the invention.
Figure 4B:
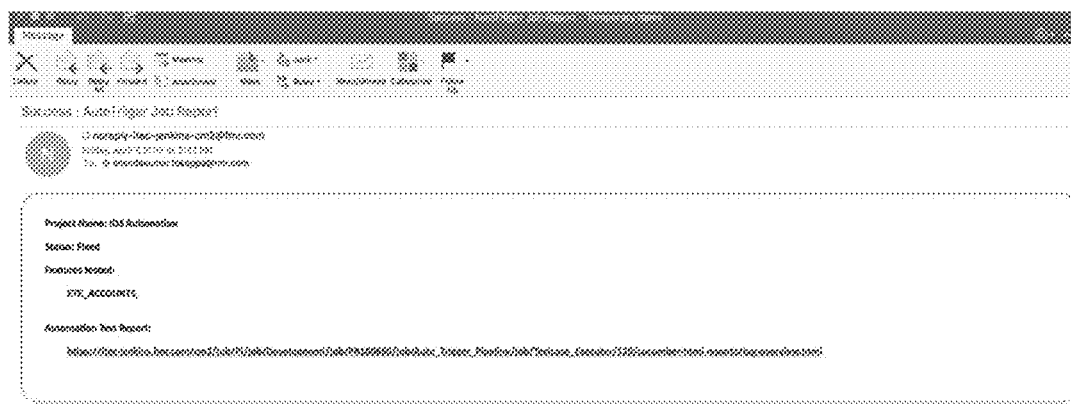
FIG. 4B shows a screenshot of an email notification indicating a failed test case execution, according to an illustrative embodiment of the invention.

FIGS. 4A-4B show screenshots of email notifications (e.g., the email 174 shown and described above in connection with FIG. 1) reporting the results a test case execution process, according to illustrative embodiments of the invention. FIG. 4A indicates a successful test case execution, and FIG. 4B indicates a failed test case execution. As shown, notification emails can include several pieces of information, such as an application or project name (e.g., "iOS Automation"), a status of execution of one or more test cases (e.g., "Failure" in FIG. 4A or "Fixed" in FIG. 4B), a list of features that were tested (e.g., "ETE_ACCOUNTS"), and a link to a detailed Automation Test Report (e.g., the report 170 shown and described above in FIG. 1). In some embodiments, the report 170 and/or email 174 are provided to the developer 116 via the development portal 120.

Figure 5A:
FIG. 5A shows a screenshot of a Cucumber report showing a successful test case execution, according to an illustrative embodiment of the invention.
Figure 5B:
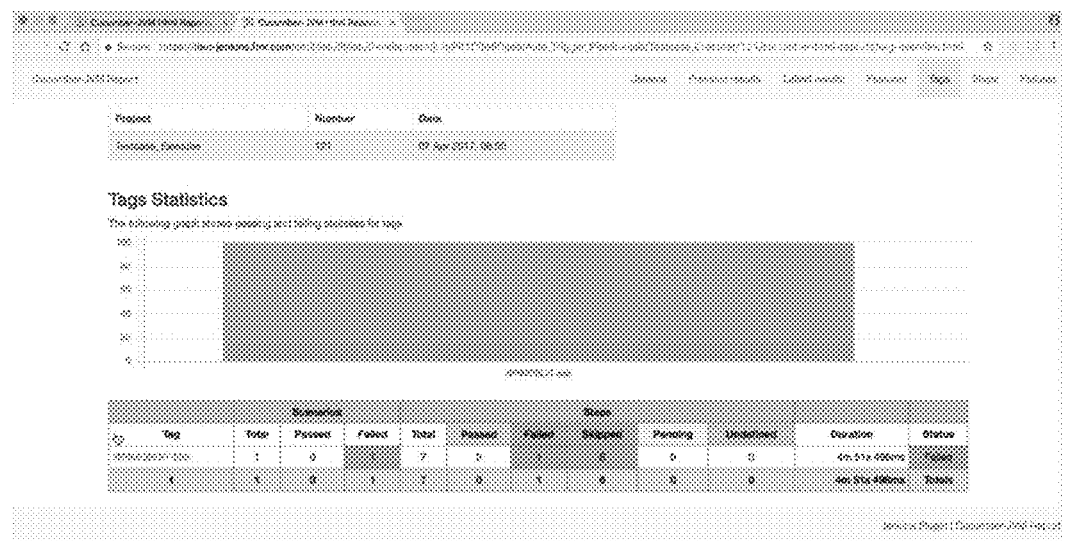
FIG. 5B shows a screenshot of a Cucumber report showing a failed test case execution, according to an illustrative embodiment of the invention.
Figure 5C:
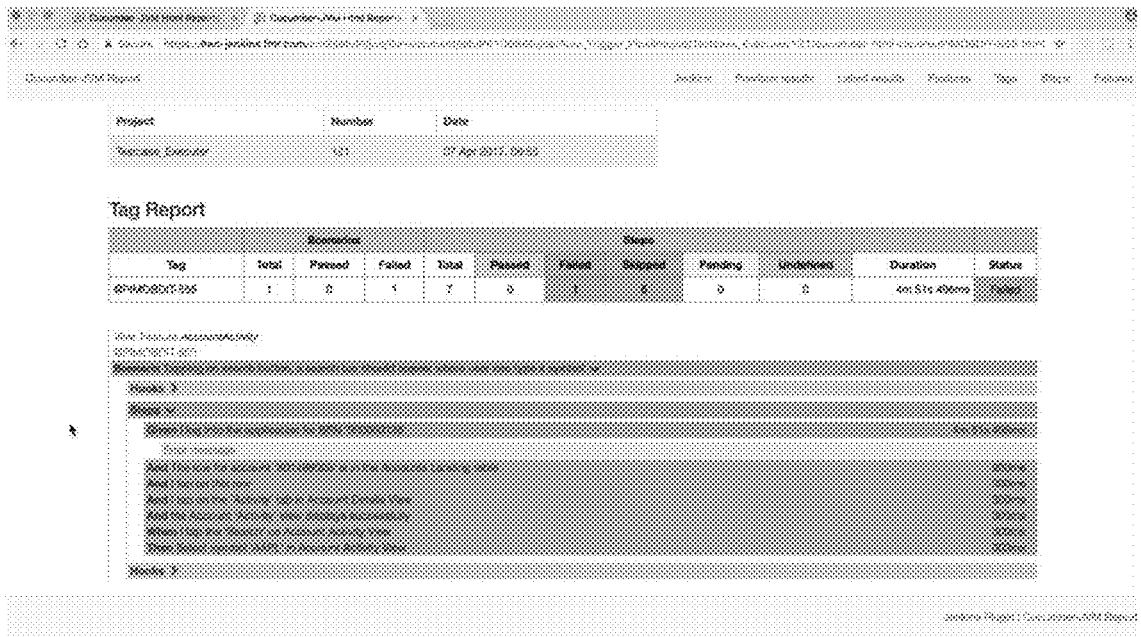
FIG. 5C shows a screenshot of a Cucumber report showing a failed test case execution with further details of the steps within execution, according to an illustrative embodiment of the invention.
Figure 5D:
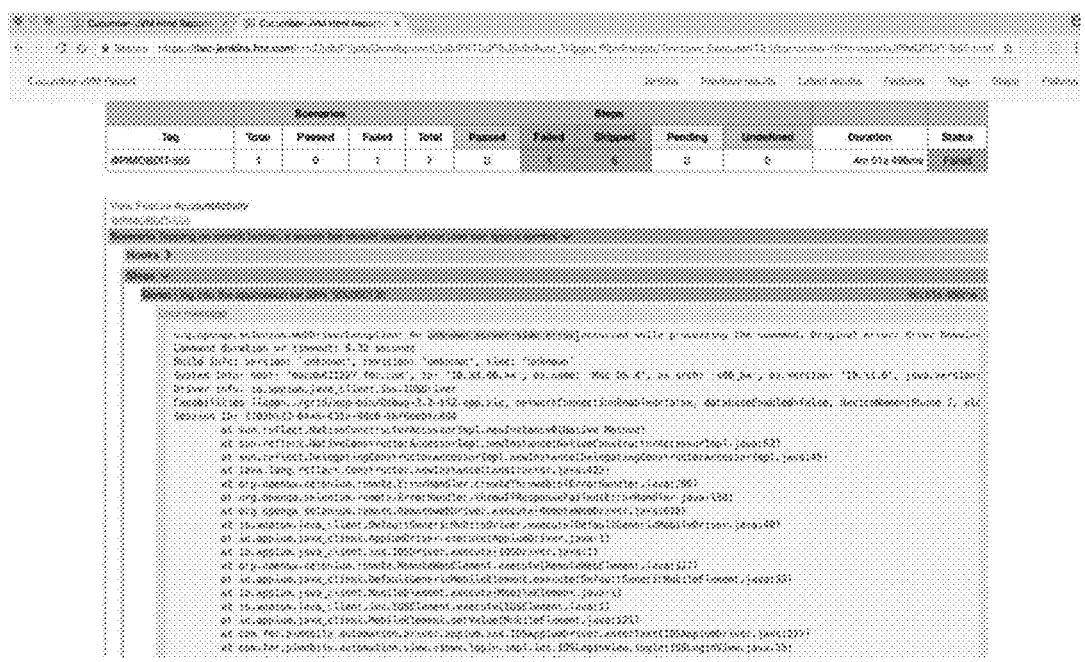
FIG. 5D shows a screenshot of a Cucumber report showing a failed test case execution and a stack trace, according to an illustrative embodiment of the invention.

FIGS. 5A-5D show screenshots of various Cucumber reports (e.g., the report 170 shown and described above in connection with FIG. 1) generated according to illustrative embodiments of the invention reflecting various levels of success of test execution and details as to failures encountered. For example, FIG. 5A shows a case in which a test case was executed successfully, and FIG. 5B shows a case in which a test case execution failed. Referring to FIG. 5A, the report 170 can provide information such as an application or project name (e.g., "Testcase_Executer"); an execution number (e.g., "120"); a date and time (e.g., "7 Apr. 2017, 05:52"); execution statistics (e.g., a bar graph of passing and failing statistics for tags); IDs of the test cases that were executed (e.g., "@PIMOBDIT-433-2"); a result of execution (e.g., "Passed"); a total number of scenarios (e.g., "1"), and numbers of scenarios that are passed (e.g., "1") and/or failed (e.g., "0"); a total number of steps (e.g., "2") and numbers of steps that are passed (e.g., "2"), failed (e.g., "0"), skipped (e.g., "0"), pending (e.g., "0"), and/or undefined (e.g., "0"), and a time taken to execute each test case (e.g., "12s 899 ms"). In the case that the test case failed, the report can also show additional helpful details. For example, FIG. 5C shows a case in which test case execution failed, but also shows more detailed notes on the component steps of execution, which allows the developer to understand in which step the test case was failed. As another example, FIG. 5D shows a case in which test case execution failed, but a complete stack trace is provided, which allows the developer to understand why a certain test case was failed and which source code change caused the failure (e.g., by referencing the name of the source code file that was changed).

It should also be understood that various aspects and embodiments of the invention can be combined in various ways. Based on the teachings of this specification, a person of ordinary skill in the art can readily determine how to combine these various embodiments. In addition, modifications may occur to those skilled in the art upon reading the specification.

---

APPENDIX A: Sample script for the first Jenkins Job

```
# Added to identify any changes in directory.
DIR_PATH="${WORKSPACE}/repo"
CHANGED=`git diff --name-only $GIT_PREVIOUS_COMMIT $GIT_COMMIT $DIR_PATH`
getFeatureArray( ) {
    featureArray=( )
    while IFS=read -r line
    do
        featureArray+=("$line")
    done < "$1"
}
getFeatureArray
"${WORKSPACE}/repo/Fidelity3/FeatureMapping.strings"
DIR_ADDED="NO"
EMAIL_ERROR_MESSAGE="Success"
arr=(${CHANGED//'/' '/' })
for var in "${arr[@]}"
do
    CHANGED_DIR=`echo $var|cut -d'/' -f3`;
    for e in "${featureArray[@]}"
    do
        featureKey=$(echo "$e" | cut -d ':' -f1)
        featureValue=$(echo "$e" | cut -d ':' -f2)
        if [ "$CHANGED_DIR" = "$featureKey" ];then
            feature=$featureValue
            dir=$dir,$feature
            DIR_ADDED="YES"
        fi
    done
    if [ "$DIR_ADDED" = "NO" ];then
        EMAIL_ERROR_MESSAGE="$CHANGED_DIR is not added in mapping file , "
        printf "\n EMAIL_ERROR_MESSAGE=${EMAIL_ERROR_MESSAGE}" >> ${WORKSPACE}/git.properties
    else
        DIR_ADDED="NO"
    fi
done
FEATURES="${dir:1}"
FEATURES=$(echo "$FEATURES"|tr "," "\n"|sort|uniq|tr "\n" ",")
```

---

APPENDIX B

Sample script for the second Jenkins Job

```
# Set path and lc_ctype for xcpretty
export PATH=$PATH:/usr/local/bin
export LC_CTYPE=en_US.UTF-8
# Set xcode 7 as the active dev tools
export DEVELOPER_DIR="/Applications/Xcode${XCODE_VERSION}.app/Contents/Developer"
export TOOLS_DIR="$DEVELOPER_DIR/usr/bin"
export DERIVED_DATA_DIR=~/Library/Developer/Xcode/DerivedData
# Remove the module cache (to prevent ".pch file has been changed since compilation"
rm -rf ~/Library/Developer/Xcode/DerivedData/*
# Unlock the keychain
security unlock-keychain -p automate
```

APPENDIX B-continued

Sample script for the second Jenkins Job

```
# unzip the source
tar -xf iphone-source.tar
cd repo/Fidelity3
echo "Feature to test is $FEATURES"
$TOOLS_DIR/xcodebuild -scheme Fidelity-iOS -workspace Fidelity3.xcworkspace -
destination 'platform=iOS Simulator,name=iPhone 7,OS=10.1' -configuration Debug test
GCC_GENERATE_TEST_COVERAGE_FILES=YES
GCC_INSTRUMENT_PROGRAM_FLOW_ARCS=YES 2>&1 | tee build_output.txt |
xcpretty -r junit
export LATEST_FIDELITY_APP_PATH=`find
~/Library/Developer/Xcode/DerivedData -name "Fidelity.app" -type d -print0 | xargs -0
ls -td1 | head -n 1`
# Find the current version of the app, save to environment variable
export IPHONE_PROJECT_MAJOR_VER=3.2
# Create properties file so we can pass certain properties to the next job
printf "IOS_BUILD_JOB=${JOB_NAME}\nAPP_BINARY=Debug-
$IPHONE_PROJECT_MAJOR_VER-
${BUILD_NO}.app.zip\nFEATURES=${FEATURES}\nAPP_BUILD_NO=${BUILD_
NO}" > ${WORKSPACE}/next-job.properties
# Zip the simulator build .app
cd ${LATEST_FIDELITY_APP_PATH}
cd ..
zip -9 -r ${WORKSPACE}/Debug-$IPHONE_PROJECT_MAJOR_VER-
${BUILD_NO}.app.zip Fidelity.app > /dev/null
```

APPENDIX C

Sample script for the fourth Jenkins Job

```
export PATH=$PATH:/usr/local/bin
export PDSH_SSH_ARGS_APPEND="-i /Users/automation/.ssh/id_botadmin"
export GRID_NODES="10.33.86.31,10.33.86.32,10.33.86.33,10.33.86.34,
10.33.86.35,10.33.86.36,10.33.86.37"
export ACCOUNT_NAME=automation
mysql -uautomation -p"${DASHBOARD_PASS}" -h 10.96.43.58 -e "UPDATE
\`automation_3x\`.build_report SET appium_test =2 WHERE build_id =
${APP_BUILD_NUMBER} AND appium_test = 0"
# create necessary directory structure if not exists
echo "creating necessary directory structure if not exists on ${GRID_NODES}....."
pdsh -1 ${ACCOUNT_NAME} -w ${GRID_NODES} "mkdir -p ~/grid/app-bin"
# Remove existing artifacts(app binaries) from nodes
echo "removing existing binaries from nodes ${GRID_NODES}"
pdsh -1 ${ACCOUNT_NAME} -w ${GRID_NODES} "rm -rf ~/grid/app-bin/*"
# Move app binary to nodes
nodes=$(echo ${GRID_NODES}| tr "," "\n")
for node in $nodes
do
    scp -B -i ~/.ssh/id_botadmin ${APP_BINARY}
${ACCOUNT_NAME} @[$node]:~/grid/app-bin
    echo "Copied app binary to [$node]"
done
#clear the contents of appium log file on each node before executing tests
pdsh -1 ${ACCOUNT_NAME} -w ${GRID_NODES} "cat /dev/null >
~/grid/log/*appium.log"
#Running tests in parallel
echo "Running Tests in Parallel using grid on connected nodes"
echo "java -cp automation-test.jar
com.abc.def.ghi.test.SmokeTestRunner
    -f "[${FEATURES}]" -b "[${APP_BINARY}]" -p IOS"
java -cp automation-test.jar
com.abc.def.ghi.test.SmokeTestRunner
    -f ${FEATURES} -b ${APP_BINARY} -p IOS
#Copying Appium Logs
echo "Copying Appium Logs from grid nodes after completing tests execution"
appiumDir="build-${APP_BUILD_NUMBER}-appium-logs"
mkdir -p $appiumDir
lognodes=$(echo ${GRID_NODES} | tr "," "\n")
for node in $lognodes
do
    scp -B -i ~/.ssh/id_botadmin ${ACCOUNT_NAME} @ [$node]:~/grid/log/*appium.log
$appiumDir/
    echo "Copied Appium log from [$node] to log directory"
done
#zip appium log files
zip -9 -r ${appiumDir}.zip $appiumDir/*
```

APPENDIX C-continued

Sample script for the fourth Jenkins Job

```
#remove appium log directory
  rm -rf $appiumDir
mysql -uautomation -p"${DASHBOARD_PASS}" -h 12.34.56.78 -e "UPDATE
\`automation_3x\`.build_report SET appium_test = 1, execution_end = NOW( ) WHERE
build_id = ${APP_BUILD_NUMBER} AND execution_end IS NULL"
```

What is claimed is:

1. A method of testing source code for a computer application, the method comprising:
  (i) monitoring, by a server having a processor and a memory, a source code repository having a plurality of source code files stored in the memory, to detect when a changed version of one or more source code files is saved to the source code repository;
  (ii) identifying, by the server, for a source code file that has been changed, one or more changed features of the source code file, by comparing a changed version of the source code file with a previous version of the source code file;
  (iii) generating, by the server, based on the one or more changed features, a source code artifact for use in testing the source code file;
  (iv) generating, by the server, based on the source code artifact, a test case framework artifact for use in testing the source code file;
  (v) executing, by the server, one or more test cases based on the one or more changed features of the source code file, the source code artifact, and the test case framework artifact, wherein details of the executed one or more test cases include, for each test case of the one or more test cases executed, a complete stack trace, a status of each step, an indication of any failed test cases, and for any failed test cases, an indication of why the test cases failed; and
  (vi) generating, by the server, a report including the details of the executed one or more test cases.

2. The method of claim 1 wherein step (i) includes using a web hook to monitor the source code repository.

3. The method of claim 1 wherein step (ii) is accomplished using a mapping file.

4. The method of claim 1 wherein step (ii) further comprises generating a list of impacted features of the source code file.

5. The method of claim 1 wherein steps (ii)-(v) are triggered automatically when the changed version of the source code file is saved to the source code repository.

6. The method of claim 1 wherein steps (ii)-(v) are performed automatically as Jenkins Jobs for each source code file of the one or more source code files that has changed.

7. The method of claim 1 wherein step (iii) includes building an artifact of iOS source code.

8. The method of claim 1 wherein step (iv) includes using a code building tool to build the test case framework artifact with a command "mvn clean package" to generate the test case framework artifact.

9. The method of claim 1 wherein step (v) is accomplished using a parallel execution grid having a hub and one or more nodes, the hub configured to receive and distribute the one or more test cases to the one or more nodes, the one or more nodes configured to execute the one or more test cases in parallel and report to the hub a status of each test case of the one or more test cases after execution.

10. The method of claim 9 wherein the hub is configured to perform intelligent tasks including configuring a virtual machine based on a number of test cases to be executed and grouping similar test cases based on resource requirements.

11. The method of claim 1 wherein the source code repository includes a distributed version control system.

12. The method of claim 1 wherein the one or more test cases are executed in parallel using a central distribution hub in electronic communication with the server, the central distribution hub also in electronic communication with one or more locations on a test case execution grid.

13. The method of claim 1 wherein the generated report is a Cucumber report.

14. The method of claim 1 wherein the memory of the server stores a standard set of critical test cases corresponding to each feature of the source code file in a correspondence table.

15. The method of claim 1 further comprising at least one of grouping or allocating of test cases based on historical test case execution data.

16. The method of claim 1 wherein the generated report is a real-time report for viewing by a software developer, the generated report including at least a name of a test case that failed, details of what step failed execution, and a reason for the failed step execution.

17. A system for testing source code for a computer application, the system comprising:
  a server having a processor and a first server memory, the first server memory having a source code repository including one or more source code files, the server configured to:
  (i) monitor the source code repository to detect when a changed version of one or more source code files is saved to the source code repository;
  (ii) identify, for a source code file that has been changed, one or more changed features of the source code file, by comparing a changed version of the source code file with a previous version of the source code file;
  (iii) generate, based on the one or more changed features, a source code artifact for use in testing the source code file;
  (iv) generate, based on the source code artifact, a test case framework artifact for use in testing the source code file;
  (v) execute one or more test cases based on the one or more changed features of the source code file, the source code artifact, and the test case framework artifact, wherein details of the executed one or more test cases include, for each test case of the one or more test cases executed, a complete stack trace, a status of each step, an indication of any failed test cases, and for any failed test cases, an indication of why the test cases failed; and
  (vi) generate a report including the details of the executed one or more test cases.

18. The system of claim 17 wherein the server includes a web hook to monitor the source code repository.

19. The system of claim 17 wherein the server includes a parallel execution grid having a hub and one or more nodes, the hub configured to receive and distribute the one or more test cases to the one or more nodes, the one or more nodes configured to execute the one or more test cases in parallel and report to the hub a status of each test case of the one or more test cases after execution.

20. The system of claim 17 wherein the source code repository includes a distributed version control system.

21. The system of claim 17 wherein the first server memory stores a standard set of critical test cases corresponding to each feature of the source code file in a correspondence table.

\* \* \* \* \*